(12) United States Patent
Freedman et al.

(10) Patent No.: US 11,565,644 B2
(45) Date of Patent: Jan. 31, 2023

(54) JACKET/VEST PASSENGER RESTRAINT SYSTEMS AND METHODS

(71) Applicant: Universal City Studios LLC, Universal City, CA (US)

(72) Inventors: Daniel Matthew Freedman, Ocoee, FL (US); Ji Hyun Han, Winter Park, FL (US); William Travis Faircloth, Stem, NC (US); Michael Joseph Troise, Manheim, PA (US); Julia Ann Javorsky, Hinckley, OH (US); Hannah Amelia Brush, Greenville, RI (US); Morgan Elizabeth Dickinson, North Greece, NY (US); Robert Henry Cybulski, III, Farmington Hills, MI (US)

(73) Assignee: Universal City Studios LLC, Universal City, CA (US)

( * ) Notice: Subject to any disclaimer, the term of this patent is extended or adjusted under 35 U.S.C. 154(b) by 748 days.

(21) Appl. No.: 16/448,638

(22) Filed: Jun. 21, 2019

(65) Prior Publication Data
US 2020/0346603 A1 Nov. 5, 2020

Related U.S. Application Data

(60) Provisional application No. 62/841,721, filed on May 1, 2019.

(51) Int. Cl.
*A63G 31/00* (2006.01)
*B60R 22/14* (2006.01)
(Continued)

(52) U.S. Cl.
CPC .............. *B60R 21/02* (2013.01); *A62B 35/00* (2013.01); *A63G 31/00* (2013.01); *B60R 22/14* (2013.01);
(Continued)

(58) Field of Classification Search
CPC ........ A63G 31/00; A63G 31/02; B60R 22/14; B60R 22/26; B60R 22/105
(Continued)

(56) References Cited

U.S. PATENT DOCUMENTS 3,499,681 A 3/1970 Benitez, Jr. et al.
3,762,505 A * 10/1973 Morse .................... B60N 2/682
296/68.1
(Continued)

*Primary Examiner* — Kien T Nguyen
(74) *Attorney, Agent, or Firm* — Fletcher Yoder, P.C.

(57) ABSTRACT

A passenger restraint system of a vehicle includes a passenger restraint article with an interface, and a locking device that secures the interface. In some embodiments, the vehicle includes a vertical channel that enables the locking device to travel up and down. The locking device may include a camera that enables the locking device to align with the interface, and once aligned, the locking device secures the interface. In additional or alternative embodiments, the locking device includes two C-bars and a biasing element that urges the locking device into an open position. When the passenger sits or leans against the opened C-bars, the force caused by the interface on the C-bars overcomes the force applied by the biasing element, urging the C-bars into a closed position. The locking device is then secured by engaging a locking bar that pushes against a surface of the C-bars.

14 Claims, 6 Drawing Sheets

(51) Int. Cl.
  *B60R 21/02*  (2006.01)
  *B60R 22/26*  (2006.01)
  *A62B 35/00*  (2006.01)
  *B60R 21/00*  (2006.01)

(52) U.S. Cl.
  CPC ...... *B60R 22/26* (2013.01); *B60R 2021/0097* (2013.01); *B60R 2021/022* (2013.01)

(58) Field of Classification Search
  USPC ........................................ 472/43, 59–61, 130
  See application file for complete search history.

(56) References Cited

U.S. PATENT DOCUMENTS

| | | | |
|---|---|---|---|
| 4,477,041 A | 10/1984 | Dunne | |
| 6,457,774 B2* | 10/2002 | Baloga | B60N 2/2812 |
| | | | 297/484 |
| 2005/0236209 A1* | 10/2005 | Chernoff | B60R 21/01552 |
| | | | 280/801.1 |

\* cited by examiner

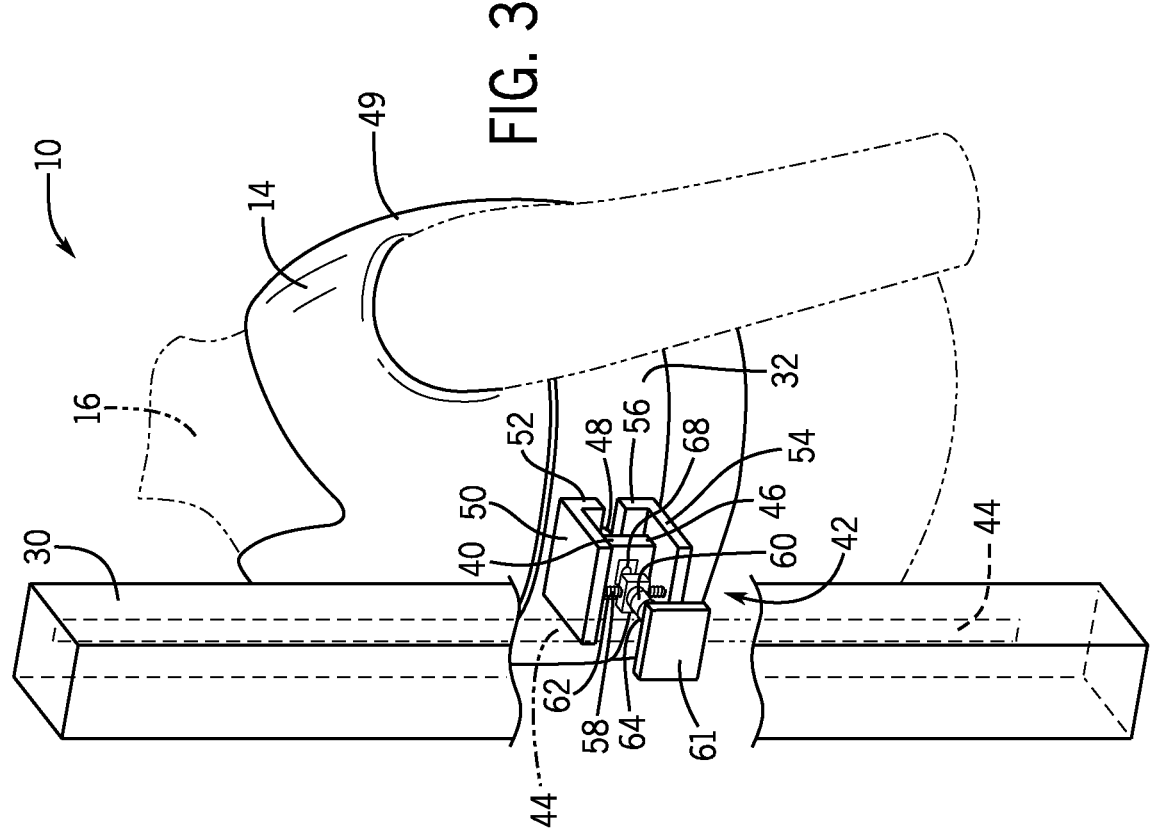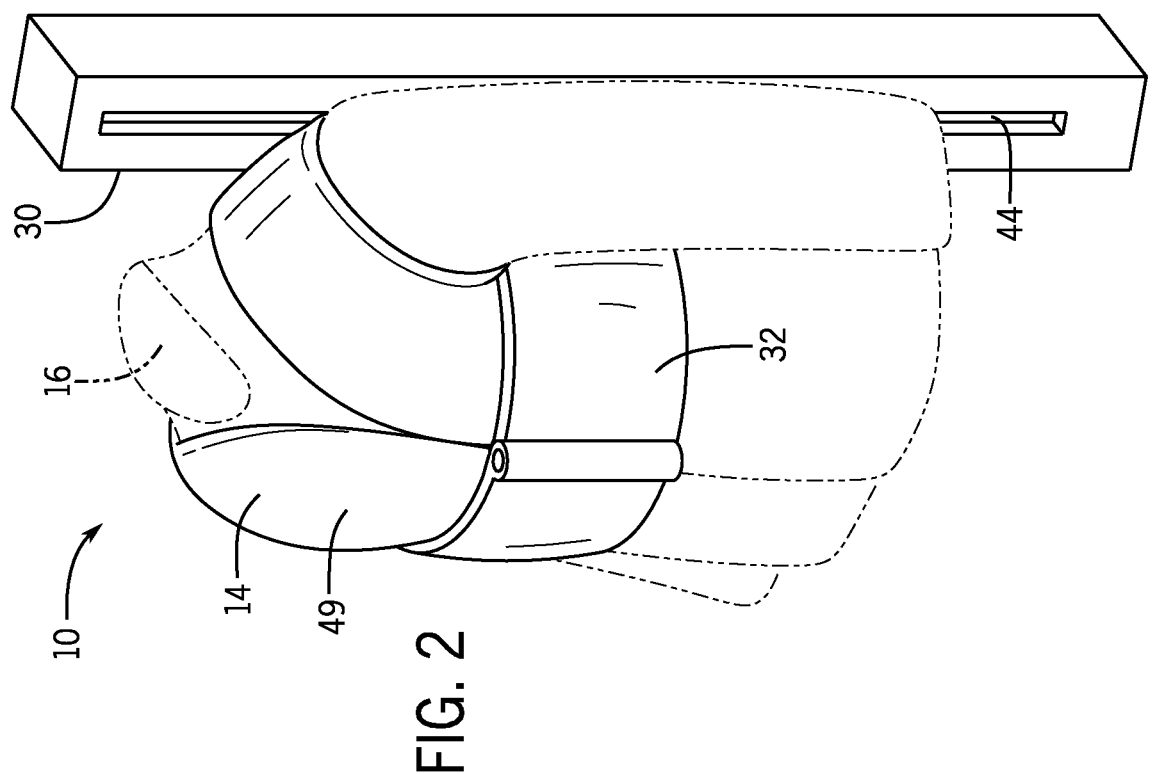

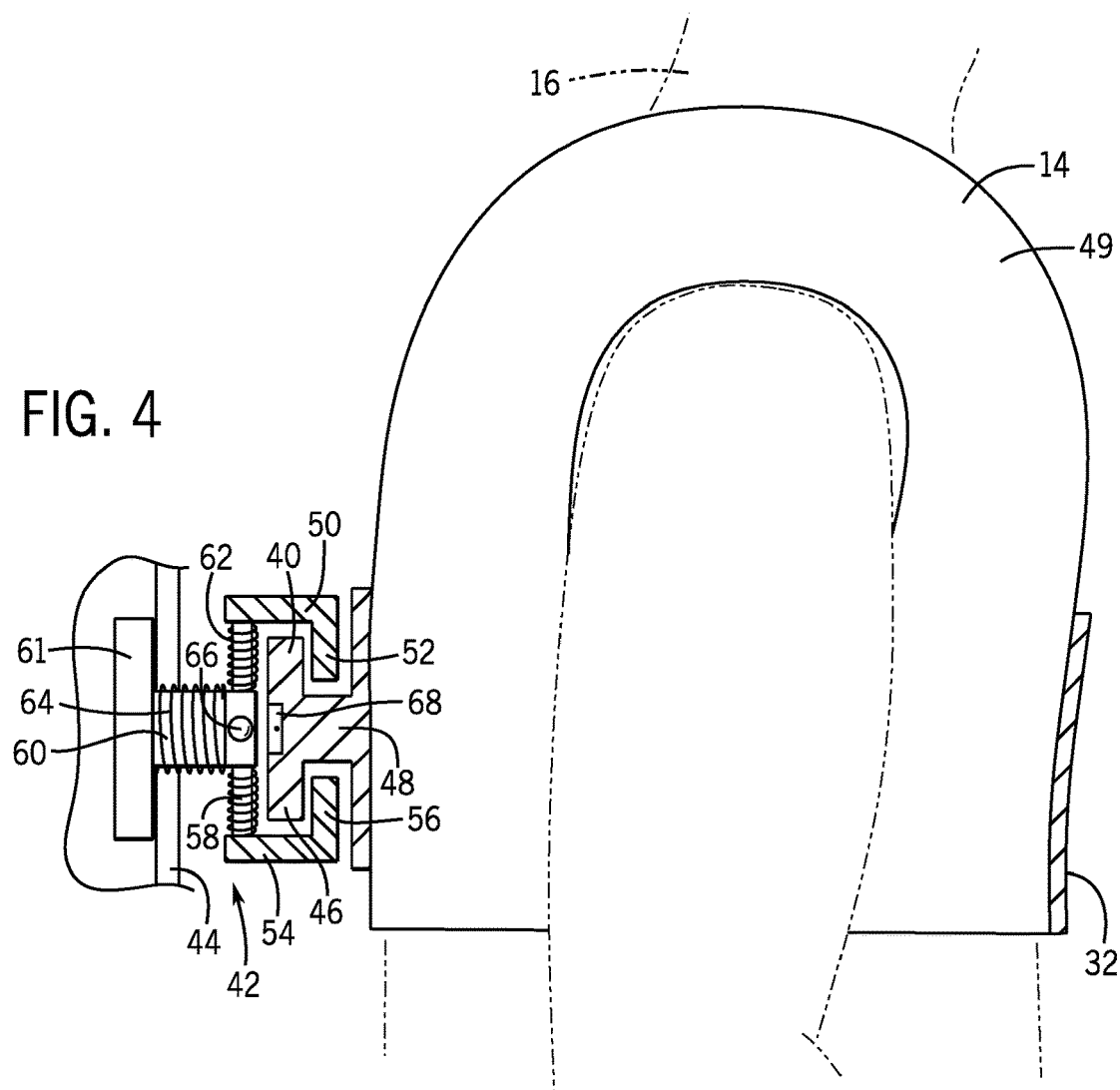
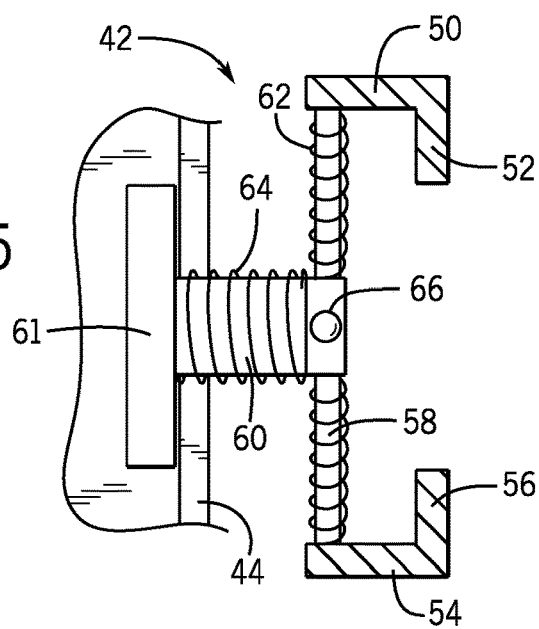

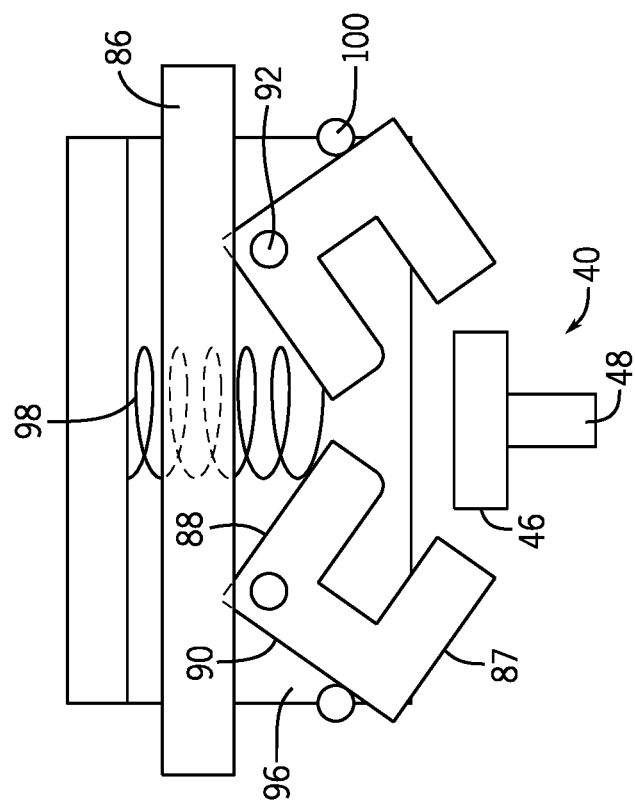
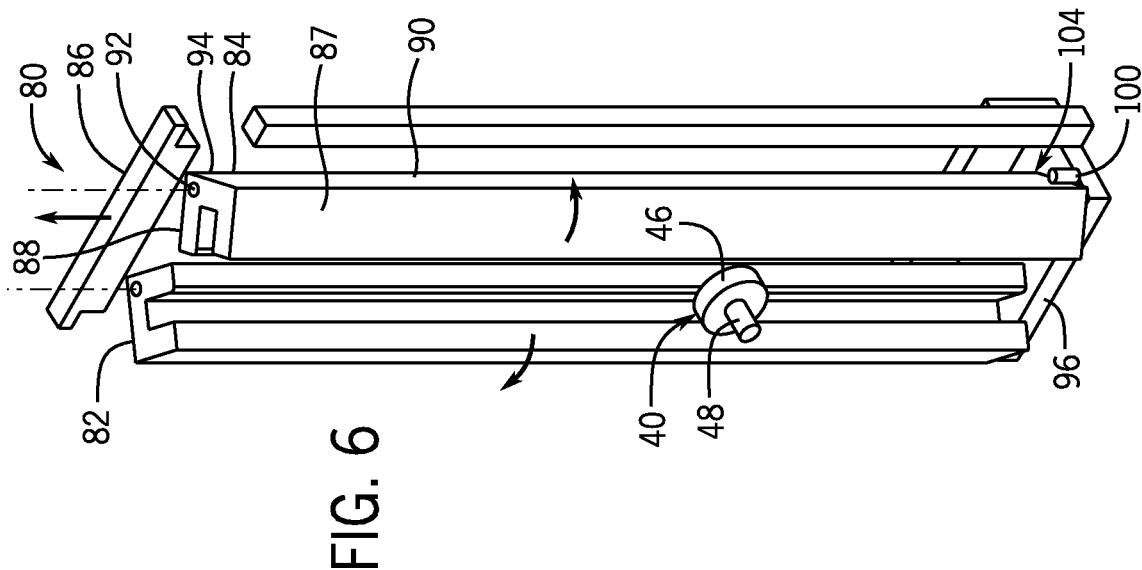

JACKET/VEST PASSENGER RESTRAINT SYSTEMS AND METHODS

CROSS-REFERENCE

This application claims the benefit of U.S. Provisional Application No. 62/841,721, entitled "JACKET/VEST PASSENGER RESTRAINT SYSTEMS AND METHODS," filed May 1, 2019, which is hereby incorporated by reference in its entirety for all purposes.

BACKGROUND

This disclosure relates generally to passenger restraints and, more particularly, to restraining passengers in vehicles using an interface that couples a passenger to a locking device of a vehicle via a passenger restraint article, such as a jacket, vest, belt, or any other similar article.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

A vehicle, such as an amusement ride or theme park vehicle may include a passenger restraint system, in forms such as a seat or lap belt, buckles, a lap bar, and so on, to secure a passenger in the vehicle. However, these conventional restraints may excessively restrict movement of passengers, such as movement of arms, legs, and/or hips of the passengers. Moreover, these restraints may not be inclusive of passengers with certain physical traits or characteristics. In some cases, these restraints may inhibit or take away from the experience of the amusement ride. Additionally, at least some of these restraints may not be controlled by a ride operator at a remote location.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a ride system includes a passenger restraint article having a locking interface. The passenger restraint article is to be worn by a passenger. The ride system also includes a passenger restraint system having a locking device that engages the locking interface such that the passenger restraint article is attached to the passenger restraint system.

In an embodiment, a passenger restraint system includes a passenger restraint article having an interface. The passenger restraint article is to be worn by a passenger. The passenger restraint system also includes a vertical channel and a locking device engaged with the vertical channel. The locking device travels along the vertical channel and secures the interface to the vertical channel. The passenger restraint system further includes a controller having a processor and a memory. The memory stores machine-readable instructions that, when executed by the processor, cause the processor to align the locking device with the interface and initiate attachment of the interface with the locking device.

In an embodiment, a locking device that secures an interface of a passenger restraint article. The locking device includes two C-bars. Each C-bar has a rod having a front surface, a rear surface, and a side surface joining the front surface and the rear surface. The locking device also includes a biasing element that urges the two C-bars into an open position, wherein channels formed in each C-bar are angled relative to each other The locking device further includes a locking bar that secures the two C-bars into a closed position, wherein the channels formed in each C-bar are opposite and facing each other to establish a cooperatively formed channel.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2 is a front perspective view of the passenger restraint system of FIG. 1 as part of a vertical structure, according to embodiments of the present disclosure;

FIG. 3 is a rear perspective view of the passenger restraint system of FIG. 1 as part of the vertical structure with a locking device in a closed position, according to embodiments of the present disclosure;

FIG. 4 is a side view of the locking device of FIG. 3 in the closed position, according to embodiments of the present disclosure;

FIG. 5 is a side view of the locking device in an open position, according to embodiments of the present disclosure;

FIG. 6 is a perspective view of a locking device of the passenger restraint system of FIG. 1 using two C-bars and a locking bar in an open position, according to embodiments of the present disclosure;

FIG. 7 is a plan view of the locking device of FIG. 6, according to embodiments of the present disclosure;

DETAILED DESCRIPTION

Figure 1:
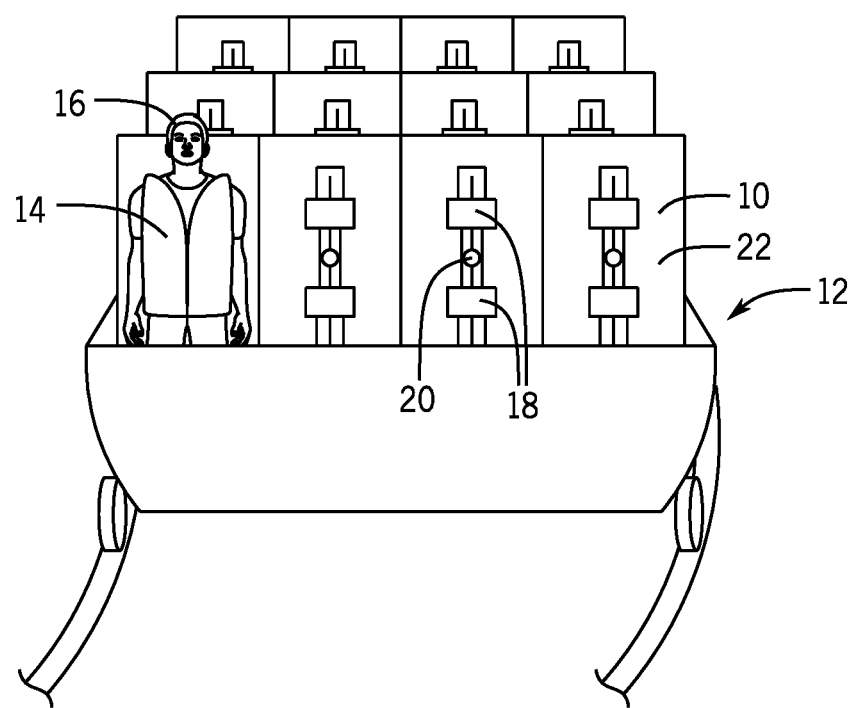
FIG. 1 is a perspective view of a passenger restraint system, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

This disclosure relates generally to passenger restraints and, more particularly, to restraining passengers in vehicles using an interface (e.g., a locking interface) that couples a passenger to a locking device of a vehicle via a passenger restraint, such as a jacket, vest, belt, or any other similar article. In some embodiments, the vehicle may include a vertical channel that enables the locking device (e.g., a clamping device) to travel up and down. The vertical channel may be in the form of a vertical column fixed to the vehicle, or part of a seat of the vehicle. The locking device may include a sensor (e.g., a camera) that enables the locking device to align with the interface, and once aligned, the locking device may secure or engage the interface (e.g., via clamping). In additional or alternative embodiments, the locking device may include two C-bars (e.g., long rods that each have a cross-section generally shaped like the letter "C") and a biasing element that urges the locking device into an open position. When the passenger sits or leans against the opened C-bars, the force caused by the interface on the C-bars may overcome the biasing force (e.g., a counter force) applied by the biasing element, thus urging the C-bars into a closed position (creating a channel between the opposite-facing C-shaped cross-sections that secures the interface). The locking device may then be secured or engaged by engaging a locking bar that pushes against a surface of the C-bars. In this manner, the presently disclosed systems and methods may secure passengers in vehicles without excessively restricting movement of the passengers, may be inclusive of passengers with certain physical traits or characteristics, and may not take away from the experience of an amusement ride or other process requiring restraint.

A controller (e.g., including a processor and a memory) may operate the locking device. For example, in the case where the locking device includes a camera and travels up and down a vertical channel of the vehicle, the controller may receive sensor (e.g., image) information from the camera, align the locking device with the interface of the passenger restraint article attached to or worn by a passenger, and secure the interface with the locking device. The controller may also disengage the interface from the locking device (e.g., when an amusement ride has finished or is complete). In the case where the locking device includes the two C-bars and a locking bar, the locking device may also include a sensor that indicates when the locking device is engaged (e.g., in a closed position) with the interface. The controller may receive this indication from the sensor, and engage the locking bar to secure the interface in the locking device. The controller may also disengage the locking bar, via control of actuators, to enable the interface to be removed from the locking device (e.g., when an amusement ride has finished or is complete). In this manner, the controller may secure and disengage the interface to and from the locking device, enabling a ride operator at a remote location to restrain and/or release passengers from a ride vehicle.

While the present disclosure describes a ride vehicle in an amusement park, it should be understood that the vehicle and environment may include any suitable vehicles and environments, such as automobiles, boats, airplanes, all-terrain vehicles, and so on, operating in enclosed facilities, outdoors, in virtual environments, and so on. Moreover, while the embodiments of the present disclosure include a ride vehicle on a path, it should be understood that the disclosed techniques may be applied to any suitable attraction or entertainment apparatus, including a stationary compartment (e.g., not on a path or track) that includes displays and/or effects that change around the stationary compartment (e.g., provide the illusion of movement) via, for example, augmented reality or virtual reality effects, a ride cabin, a seat on a simulator, an attachment to a guiderail for a virtual reality attraction, and so on.

As an introduction, FIG. 1 is a perspective view of a passenger restraint system 10, according to embodiments of the present disclosure. A ride vehicle 12 may include the passenger restraint system 10, which may couple to an interface (e.g., a locking interface) of a passenger restraint article 14 attached to or worn by a passenger 16. As illustrated, the passenger restraint article 14 is a vest, though in alternative or additional embodiments, the passenger restraint article 14 may include a jacket, a belt, or any other suitable article. The passenger restraint article 14 may be considered part of or separate from the passenger restraint system 10. A locking device 18 of the passenger restraint system 10 is configured to couple to the interface of the passenger restraint article 14 and, thus, the various components of the passenger restraint system 10 are configured to cooperate to restrain the passenger 16. The passenger restraint article 14 may be made of any suitable material that may, for example, allow for flexibility and durability, such as athletic nylon. For additional strength, the passenger restraint article 14 may incorporate straps in any suitable material and/or pattern, such as woven polyester and/or seat-belt material in a crisscross pattern. Moreover, the material may be chosen to be waterproof and/or emphasize easy cleaning, such as nylon and/or PVC foam (e.g., as an interior material). The passenger restraint system 10 may also include one or more sensors 20 (e.g., a camera) that provide data to enable a controller (e.g., including a processor and a memory) to operate the passenger restraint system 10 to restrain and release the passenger 16. While the passenger restraint system 10 is shown as part of a seat 22 of the vehicle 12, in some embodiments, the passenger restraint system 10 may be part of a vertical support or structure (e.g., a column, wall, pillar, and so on) of the vehicle 12.

In some embodiments, the passenger restraint articles 14 may be of different sizes or may be adjusted for different sizes to accommodate differently sized passengers 16 (e.g., adults, children, and so on). Moreover, a passenger restraint article 14 may include electronic components that may enhance the experience of the amusement ride. For example, the passenger restraint article 14 may include haptic devices, speakers, lights, and/or controllers that operate other components of the passenger restraint articles 14. These components may be powered by a power source that may be part of or attached to the passenger restraint article 14, such as a battery. In some cases, the power source may be part of or provided via the seat 22 and/or the vehicle 12. In such cases, the interface may couple to a locking device (described in further detail below), and, in coupling the interface to the locking device, a power connection may be made. For example, the interface may include a power coupling (e.g., male or female), and the locking device of the vehicle 12 may include a counterpart (e.g., female or male) power coupling. As such, coupling the interface to the locking device may create a power connection by coupling the power coupling to the counterpart power coupling. The power may be provided via a wired connection, induction, and/or both.

FIG. 2 is a perspective view of the passenger restraint system 10 of FIG. 1 including a vertical support or structure 30 (e.g., a column), according to embodiments of the present disclosure. As illustrated, the passenger restraint article 14 may include one or more fasteners 32 that enable secure attachment or fitting of the passenger restraint article 14 to the passenger 16. Any suitable fastener 32 may be used, such as zippers, buttons, hooks and loops (e.g., including Velcro), magnets, clasps, and so on. In some cases, the fasteners 32 may be positioned or configured to be opened by a ride operator. For example, the fasteners 32 may be positioned in the back of the passenger restraint article 14. In some embodiments, the fasteners 32 may include a lock, which may be opened by a key or pin that is in the ride operator's possession.

FIG. 3 is a perspective view of the passenger restraint system 10 of FIG. 1 from a rear of the passenger restraint system 10, which includes the vertical structure 30 with a locking device 42 (e.g., a clamping device) in a closed position, according to embodiments of the present disclosure. As illustrated, the passenger restraint article 14 includes the interface 40 (e.g., a locking interface) that is attached, mounted, and/or fixed to the passenger restraint article 14. The locking device 42 of the passenger restraint system 10 is shown in an engaged or closed position, securing the interface 40 such that the passenger 16 is restrained (e.g., cannot extract the interface 40 from the locking device 42 without disengaging or opening the locking device 42). The locking device 42 may travel up and down a channel 44 of the vertical structure 30 (e.g., via instructions sent by a controller and an actuator). While the channel 44 is illustrated as vertical, it should be understood that the presently disclosed systems and methods may be applied to channels or rails of other configurations (e.g., horizontal configurations, arcuate configurations, and so on). Hydraulics, magnets, pulley systems, and the like may be controlled by a controller to maneuver the locking device 42.

FIG. 4 is a side view of the locking device 42 of FIG. 3 in the closed position, and FIG. 5 is a side view of the locking device 42 in an open position, according to embodiments of the present disclosure. The interface 40 is illustrated as having a securing portion 46 (which may be gripped, grasped, clamped, or otherwise secured by the locking device 42), and a shaft 48 (which may couple the securing portion 46 to a main body 49 of the passenger restraint article 14). While the securing portion 46 is illustrated as having a profile that is rectangular in shape, it should be understood that the securing portion 46 may have any suitable shape and/or dimensions that enable the locking device 42 to secure the interface 40 such that the interface 40 may not be removed from the locking device 42 without disengaging or opening the locking device 42. For example, the securing portion 46 may have a circular shape, a diamond shape, a hexagonal shape, a spherical shape, a conical shape (e.g., with the point of the conical shape pointing toward the passenger restraint article 14), a pyramid shape, and so on. In such embodiments, the locking device 42 may have or form a correspondingly-shaped receptacle configured to engage with the securing portion 46.

The locking device 42 is illustrated as a clamping device having a top rectangular surface 50 with an overhanging portion 52, a bottom rectangular surface 54 with a raised portion 56, a vertical portion 58 coupled to the top rectangular surface 50 and the bottom rectangular surface 54, and a shaft 60 coupling the vertical portion 58 to a base 61. The base 61 may be moved along the channel 44 of the vertical structure 30, thus moving the locking device 42. The vertical portion 58 may be able to expand and contract, and thus may include one or more biasing elements 62 (e.g., a spring) and/or actuators, to facilitate securing the interface 40. In particular, the vertical portion 58 may expand, as illustrated in FIG. 5, to position the securing portion 46 of the interface 40 between the vertical portion 58 and the overhanging portion 52/raised portion 56, and then contract to secure the interface 40, as illustrated in FIG. 4. While the top and bottom rectangular surfaces 50, 54 may contact the interface 40 when the interface 40 is secured, in some embodiments, there may be space or a gap between the top and bottom rectangular surfaces 50, 54 and the interface 40 when secured to provide some freedom of movement (e.g., in a vertical direction) for the passenger 16. The shaft 60 may also include a biasing element 64 (e.g., a spring) and/or actuator, which may enable some freedom of movement (e.g., in a horizontal direction) for the passenger 16 to push into and pull away from the vertical structure 30. While the locking device 42 is described as a clamping device with two main surfaces 50, 54, it should be understood that any configuration or design of the locking device 42 that suitably secures the interface 40 is contemplated, such as a socket, pincer, hinged clamshell, and so on.

The locking device 42 may include a sensor 66, such as a camera, that may enable the locking device 42 to align with the interface 40. For example, the sensor 66 may determine if it is level or at a target or minimum distance to the interface 40. In some embodiments, the interface 40 may include a marker 68 that may facilitate aligning the locking device 42 with the interface 40. That is, the sensor 66 may provide data that determines if the locking device 42 is level or at a target or minimum distance to the marker 68 of the interface 40. The marker 68 may include any suitable visual identifier that enables the sensor 66 to determine if the locking device 42 is aligned with the interface 40, such as a symbol, graphic, unique code, barcode, quick response (QR) code, and so on. Once properly aligned, the locking device 42 may close to secure the interface 40. While the sensor 66 is described as being part of the locking device 42, it should be understood that the sensor 66 may be located on or in any suitable component of the passenger restraint system 10, such as along the vertical structure 30, part of the interface 40, fixed to the passenger restraint article 14, part of the seat 22 or the vehicle 12, and so on.

FIG. 6 is a perspective view of a locking device 80 of the passenger restraint system 10 of FIG. 1 using two C-bars 82, 84 and a locking bar 86 in an open position, according to embodiments of the present disclosure. The C-bars 82, 84 are representative of various types of cooperative engagement features that include channels configured to secure about the interface 40. Each C-bar 82, 84 may be a long rod that includes a cross-section shaped like the letter "C". That is, each C-bar 82, 84 may include a front surface 87 (e.g., closest to a passenger 16), a rear surface 88 (e.g., closest to the locking bar 86), and a side surface 90 joining the front and rear surfaces 87, 88. Each C-bar 82, 84 may include a hinge 92 at a corner 94 joining the rear surface 88 and the side surface 90 that rotatably couples the respective C-bar 82, 84 to a base 96 and/or a top of the locking device 80. Each C-bar 82, 84 includes a channel along its length and those channels face each other when the locking device 80 is in a closed configuration, which allows the C-bars 82, 84 to cooperatively capture the interface 40 and allow the interface 40 to travel along the cooperatively formed channel of closed C-bars 82, 84.

FIG. 7 is a plan view of the locking device 80 of FIG. 6, according to embodiments of the present disclosure. As illustrated, the locking device 80 may include a biasing element 98 (e.g., a spring) that urges or applies a force to bias the C-bars 82, 84 into the open position. The channels of each C-bar 82, 84 may be angled relative to each other. The locking device 80 may also include stops 100 that prevent the C-bars 82, 84 from opening beyond a target position.

Figure 9:
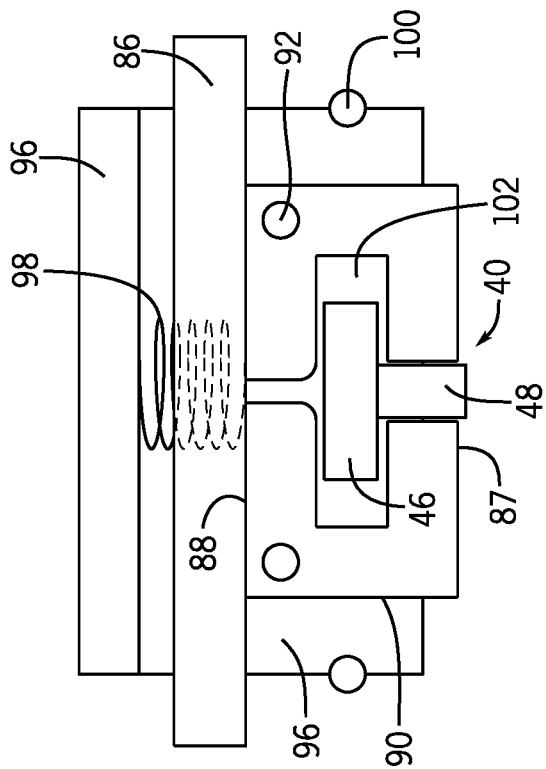
FIG. 9 is a plan view of the locking device of FIG. 8, according to embodiments of the present disclosure.
Figure 8:
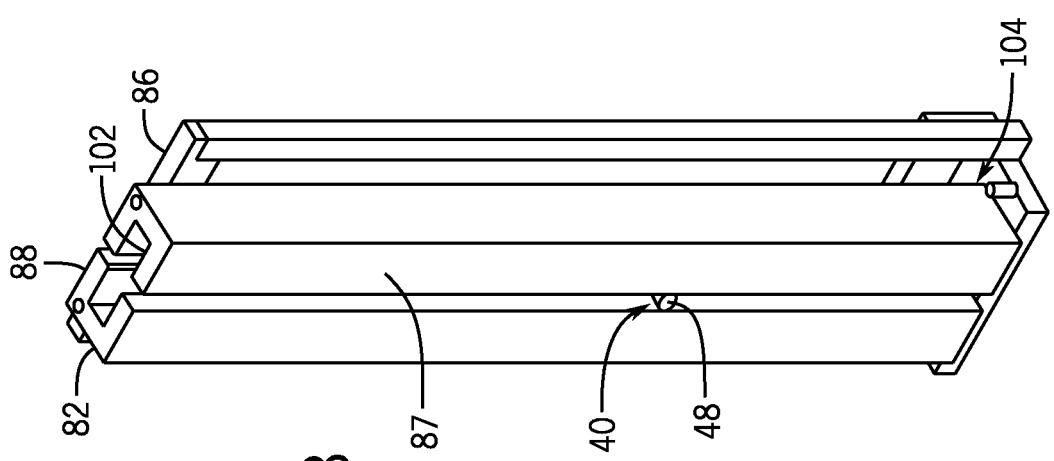
FIG. 8 is a perspective view of the locking device of FIG. 6 in a closed position, according to embodiments of the present disclosure.

FIG. 8 is a perspective view of the locking device 80 of FIG. 6 in a closed position, according to embodiments of the present disclosure. As illustrated, the channels formed in each C-bar 82, 84 are opposite and facing each other to establish a cooperatively formed channel 102. Similarly, FIG. 9 is a plan view of the locking device 80 of FIG. 8, according to embodiments of the present disclosure. The biasing element 98 may be designed, configured, and/or selected such that when the passenger 16 sits or leans against the vertical structure 30 or the seat 22 containing the locking device 80, the force applied by the interface 40 of the passenger restraint article 14 worn by the passenger 16 is greater than the force applied by the biasing element 98. As such, the C-bars 82, 84 may be urged into the closed position when the passenger 16 sits or leans against the vertical structure 30 or the seat 22 containing the locking device 80, creating the cooperatively formed channel 102. Moreover, the front surface 87 of each C-bar 82, 84 may be shorter in length than the rear surface 88 to accommodate closing the C-bars 82, 84 while allowing the shaft 48 of the interface 40 to protrude between the C-bars 82, 84. In some embodiments, the cooperatively formed channel 102 may be recessed to prevent the passenger 16 from contacting any interior portion of the cooperatively formed channel 102. Moreover, the cooperatively formed channel 102 may be recessed to prevent the interface 40 from pushing against the passenger's back.

Once the interface 40 is secured by the C-bars 82, 84, the locking bar 86 may be engaged (e.g., by a controller or a ride operator) by moving into position along the rear surfaces 88 of the C-bars 82, 84, as shown in FIGS. 8-9. In some embodiments, a biasing element (e.g., a spring) may be disposed above the locking bar 86, such that the locking bar 86 is engaged by the biasing element applying a force in a downward direction on the locking bar 86 that urges the locking bar 86 into place when the C-bars 82, 84 are in the closed position. In alternative or additional embodiments, the locking bar 86 may be engaged by a controller communicatively coupled to, for example, an actuator that may move the locking bar 86 into the engaged position and into the disengaged position. With the locking bar 86 in place, the C-bars 82, 84 are prevented from opening, thus securing the passenger 16 wearing the passenger restraint article 14 having the interface 40. While the locking bar 86 is shown as a single bar in FIGS. 6-9, it should be understood that the locking bar 86 may be of any suitable design or configuration that, once in place, prevents the C-bars 82, 84 from opening until removed. Additionally, a single locking bar 86 may be used for multiple seats 22. For example, for a row of multiple seats 22, a single locking bar 86 may extend across each seat 22 and be engaged and disengaged with a single action (e.g., by the biasing element or the controller). In some cases, the locking bar 86 may be secured into place once it is engaged. For example, the locking bar 86 may include a hole or socket for a pin or key that keeps the locking bar 86 in place once it is engaged. The locking bar 86 may be disengaged by first removing the pin or key from the hole or socket. In some embodiments, the locking bar 86 includes one or more extensions that engage the cooperatively formed channel 102 such that the C-bars 82, 84 are forced into the closed configuration until the extensions of the locking bar 86 are extracted from the cooperatively formed channel 102.

In some embodiments, the locking device 80 may include one or more sensors 104 that determine when the C-bars 82, 84 are in the open position (as shown in FIGS. 6 and 7) and/or in the closed position (as shown in FIGS. 8 and 9). The sensor 104 may be any suitable sensor that may determine the position of the C-bars 82, 84, such as an image sensor (e.g., a camera), a pressure sensor, and so on. A controller may then, for example, receive an indication (e.g., sensor data) from the sensor 104 indicating that the C-bars 82, 84 are in the closed position, and engage the locking bar 86 to secure the interface 40 (as shown in FIGS. 8 and 9) and restrain the passenger 16. The controller may also disengage the locking bar 86 (e.g., by raising the locking bar 86 to enable the C-bars 82, 84 to open, as shown in FIGS. 6 and 7, to release the passenger 16.

Advantageously the disclosed passenger restraint system 10 may conveniently restrain passengers of different heights due to the ability of the locking devices 42, 80 to secure interfaces 40 at different heights. Moreover, the system 10 may provide greater lateral stability than conventional restraints (e.g., by preventing the passenger 16 from sliding across the seat 22). Additionally, the system 10 illustrated in FIGS. 6-9 enables manual disengagement of the locking bar 86 (e.g., by pulling up on the locking bar 86 to enable the C-bars 82, 84 open), thus enabling release of the passengers if a controller or control system is disabled or inoperable. It should be understood that while the described passenger restraint system 10 may be used without additional restraints, it is contemplated that other restraints may be used in addition to the passenger restraint system 10 for additional restraint (such as lap belts, torso belts, lap bars, handles, grips, and so on).

Figure 10:
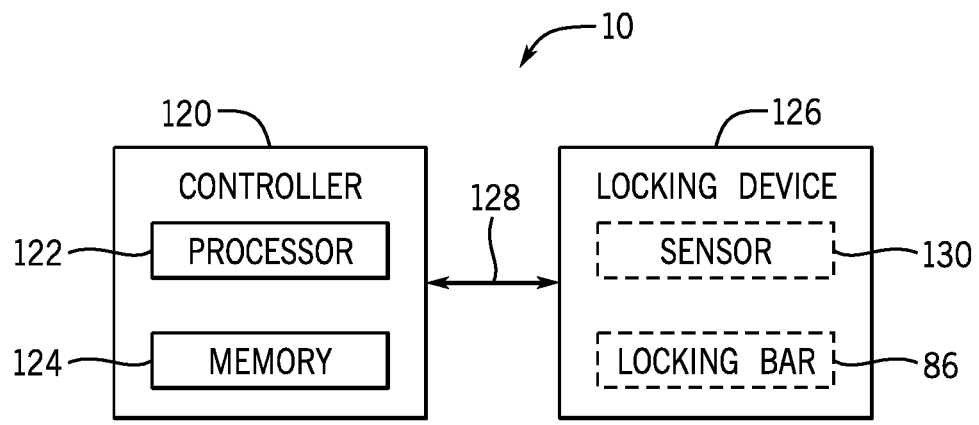
FIG. 10 is a block diagram of the passenger restraint system of FIG. 1 having a controller, according to embodiments of the present disclosure.

FIG. 10 is a block diagram of the passenger restraint system 10 of FIG. 1 having a controller 120, according to embodiments of the present disclosure. The controller 120 may have one or more processors (illustrated as a single processor 122) and one or more memory or storage devices (illustrated as a single memory device 124). The processor 122 may execute software programs and/or instructions stored in the memory device 124 that facilitate operating the passenger restraint system 10 and, particularly, the locking device 126. Moreover, the processor 122 may include multiple microprocessors, one or more "general-purpose" microprocessors, one or more special-purpose microprocessors, and/or one or more application specific integrated circuits (ASICs). For example, the processor 122 may include one or more reduced instruction set (RISC) processors. The memory device 124 may store information such as control software, look up tables, configuration data, and so forth. The memory device 124 may include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium. The memory device 124 may store a variety of information and may be used for various purposes.

The controller 120 may be communicatively coupled to the locking device 126 via any suitable communication connection 128 (e.g., wired, wireless, or both) and/or network. For example, the communication network may include a local area network, a metropolitan area network, a wide area network, a wireless network, and/or an inter network or Internet. As such, the communication connection 128 may use any suitable communication protocol to communicate with the locking device 126, such as WiFi, infrared, Ethernet, Bluetooth, Thread, ZigBee, Z-Wave, KNX, mobile, and so on.

The controller 120 may operate the locking device 126 to engage or disengage. The locking device 126 may include the locking device 42 illustrated in FIGS. 3-5. As such, the controller 120 may operate the locking device 42 to align with the interface 40 by instructing the locking device 42 to move up and/or down the channel 44. The controller 120 may also operate the locking device 42 to close to secure an aligned interface 40 and/or open to release the interface 40. The locking device 126 may also include one or more sensors 130. For example, the sensor 130 may include the sensor 66 (e.g., camera) of FIGS. 3-5. As such, the controller 120 may receive sensor information (such as images) from the sensor 66 that the controller may use to determine whether the locking device 42 is aligned with the interface 40. The controller 120 may instruct the locking device 42 to close when the sensor 66 provides sensor information or data that indicates that the locking device is aligned with the interface 40.

The locking device 126 may also or alternatively include the locking device 80 illustrated in FIGS. 6-9. As such, the controller 120 may operate the locking bar 86 of the locking device 80 to engage and/or disengage with the two C-bars 82, 84. In some embodiments, the sensor 130 may include the sensor 104 (e.g., camera or pressure sensor) of FIGS. 6-9. As such, the controller 120 may receive sensor information or image information from the sensor 104 that indicates whether the C-bars 82, 84 are in a closed position. The controller 120 may instruct the locking bar 86 to close when the sensor information or image information 104 indicates that the C-bars 82, 84 are in the closed position. Moreover, while the present disclosure describes the two C-bars 82, 84 being urged into the closed position based on pressure or force applied by the passenger 16 sitting or leaning against the vertical structure 30 or the seat 22 containing the locking device 80, in some embodiments, the controller 120 may operate the two C-bars 82, 84 to place them in the open and/or closed positions.

Advantageously, use of the controller 120 to enable a ride operator to operate the passenger restraint system 10 remotely, in combination with the passenger restraint articles 14 that passengers 16 may equip prior to entering the ride vehicle 12, may enable efficient loading and unloading procedures.

Figure 11:
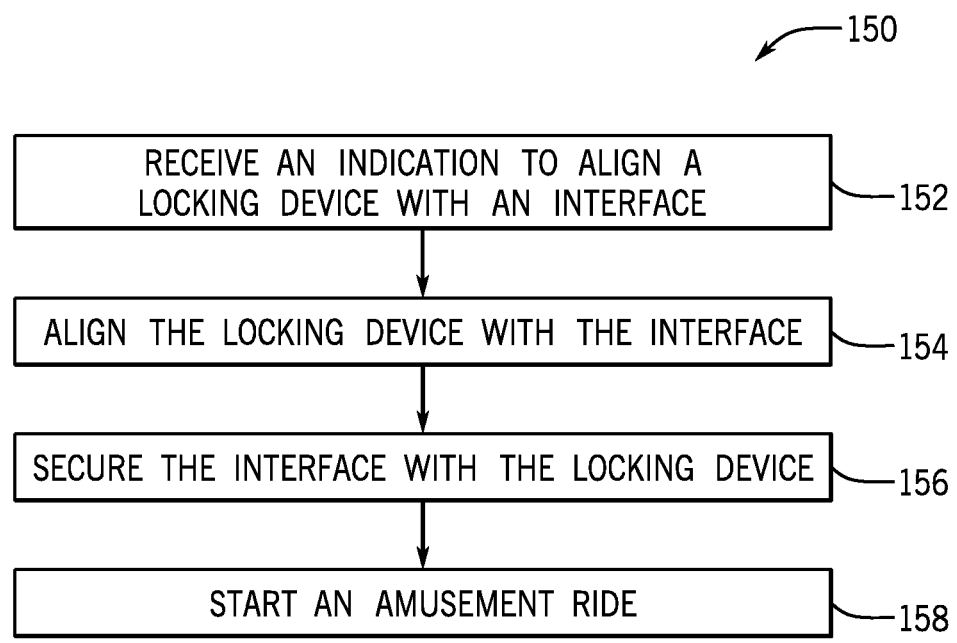
FIG. 11 is a flowchart illustrating a method for operating the passenger restraint system shown in FIGS. 3-5, according to embodiments of the present disclosure.

FIG. 11 is a flowchart illustrating a method 150 for operating the passenger restraint system 10 shown in FIGS. 3-5, according to embodiments of the present disclosure. The method 150 may be performed by any suitable device that may operate the passenger restraint system 10, such as the processor 122. While the method 150 is described using steps in a specific sequence, it should be understood that the present disclosure contemplates that the described steps may be performed in different sequences than the sequence illustrated, and certain described steps may be skipped or not performed altogether. In some embodiments, the method 150 may be implemented by executing instructions stored in a tangible, non-transitory, computer-readable medium, such as the memory device 124, using a processor, such as the processor 122.

As illustrated, in process block 152, the processor 122 receives an indication to align the locking device 42 with the interface 40. For example, passengers 16 may board a ride vehicle 12, and a ride operator or sensors of the ride vehicle 12 may send the indication to the processor 122 to align locking devices 42 of the ride vehicle 12 with interfaces 40 of passenger restraint articles 14 equipped by the passengers 16.

In process block 154, the processor 122 aligns the locking device 42 with the interface 40. In particular, the processor 122 may receive sensor information (e.g., image data) from the sensor 66 (e.g., a camera) of the locking device 42 that, for example, indicates a position of the interface 40. The processor 122 may then determine whether the locking device 42 is aligned with the interface 40. For example, the processor 122 may determine whether the sensor or image information indicates that the locking device 42 is level or at a target or minimum distance from the interface 40. In some embodiments, the processor 122 may determine whether the locking device 42 is physically correlated with (e.g., level with, within a target alignment of, or a minimum distance from) a marker 68 of the interface 40 using the sensor or image information. If not, the processor 122 may instruct the locking device 42 to move up or down along the channel 44 to align with the interface 40. Specifically, the processor 122 may activate electromagnets, hydraulics, or other actuators to achieve this function.

In process block 156, in response to aligning the locking device 42 with the interface 40, the processor 122 initiates attachment of or secures the interface 40 with the locking device 42. As such, the processor 122 may instruct the locking device 42 (e.g., a clamping device) to close and engage the interface 40, securing the interface 40 and restraining the passenger 16.

In process block 158, the processor 122 may send an indication to the ride operator that the passenger 16 is secure and/or start the amusement ride or activity or process requiring restraint. In this manner, the method 150 may operate the passenger restraint system 10 shown in FIGS. 3-5 to safely restrain passengers while providing freedom of movement for arms, legs, and/or hips of the passengers 16. Moreover, the method 150 allows inclusivity of passengers of varying body types and physical characteristics. As such, the method 150 may increase or maximize ride enjoyment and experience for passengers 16, while providing greater lateral stability than conventional restraints (e.g., by preventing the passenger 16 from sliding across the seat 22).

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. A ride system comprising:
   a passenger restraint article comprising a locking interface, wherein the passenger restraint article is configured to be worn by a passenger; and
   a passenger restraint system comprising a locking device disposed in a column of a vehicle and configured to engage the locking interface such that the passenger restraint article is attached to the passenger restraint system.

2. The ride system of claim 1, wherein the locking device comprises a clamping device.

3. The ride system of claim 1, wherein the passenger restraint system comprises a controller configured to align the locking device with the locking interface based on sensor information indicative of a position of the locking interface.

4. The ride system of claim 3, wherein the passenger restraint system comprises a channel disposed in a support of the vehicle, wherein the controller is configured to control movement of the locking device along the channel to align the locking device with the locking interface.

5. The ride system of claim 4, wherein the support comprises the column, and wherein the controller is configured to control vertical movement of the locking device.

6. The ride system of claim 3, wherein the locking device comprises a camera, wherein the sensor information comprises image data received from the camera.

7. The ride system of claim 1, wherein the locking device is disposed in a seat of the vehicle.

8. The ride system of claim 1, wherein the locking device comprises two C-bars, a biasing element configured to urge the two C-bars into an open position, and a locking bar configured to secure the two C-bars into a closed position.

9. The ride system of claim 8, wherein the two C-bars are configured to be urged into the closed position by a force applied by the passenger sitting or leaning against the two C-bars.

10. The ride system of claim 9, wherein the biasing element is configured to apply a counter force that is overcome by the force applied by the passenger sitting or leaning against the two C-bars.

11. The ride system of claim 8, comprising a second biasing element configured to urge the locking bar into an engaged position when the two C-bars are in the closed position.

12. The ride system of claim 11, comprising a controller configured to disengage the locking bar via control of an actuator.

13. The ride system of claim 1, wherein the locking interface comprises a power coupling, wherein the locking device comprises a counterpart power coupling, and wherein coupling the locking interface to the locking device creates a power connection by coupling the power coupling to the counterpart power coupling.

14. The ride system of claim 1, wherein the vehicle comprises the passenger restraint system, and the passenger restraint article is configured to be equipped prior to entry to the vehicle.

* * * * *